Dec. 11, 1928.

H. C. LORD

UNIVERSAL JOINT

Filed March 13, 1926

1,695,116

Inventor
Hugh C. Lord

Patented Dec. 11, 1928.

1,695,116

UNITED STATES PATENT OFFICE.

HUGH C. LORD, OF ERIE, PENNSYLVANIA.

UNIVERSAL JOINT.

Application filed March 13, 1926. Serial No. 94,433.

In the forming of universal joints several plans have been used, one plan involving the formation of a cross with extending pins and forks on the two elements of the joints arranged on these pins. Such a structure involves some difficulty as to assembling and the present invention is designed to obviate this difficulty. Generally speaking it involves a means whereby the pins may be clamped in the central block and thus the parts readily assembled, or released by the closing or opening of the clamp formed by the block. The invention is of particular advantage with relation to universals involving rubber elements in the joints in that the rubber elements may be readily pressed into the forks and the extending pins readily engaged by the parts of the block. This also affords a means for accurately locating the pins relatively to the block both as to neutralizing the strains on the rubber and as to locating the forks radially relatively to the blocks. Features and details of the invention will appear from the specification and claims.

The invention is illustrated in the accompanying drawings as follows:—

Figure 1:
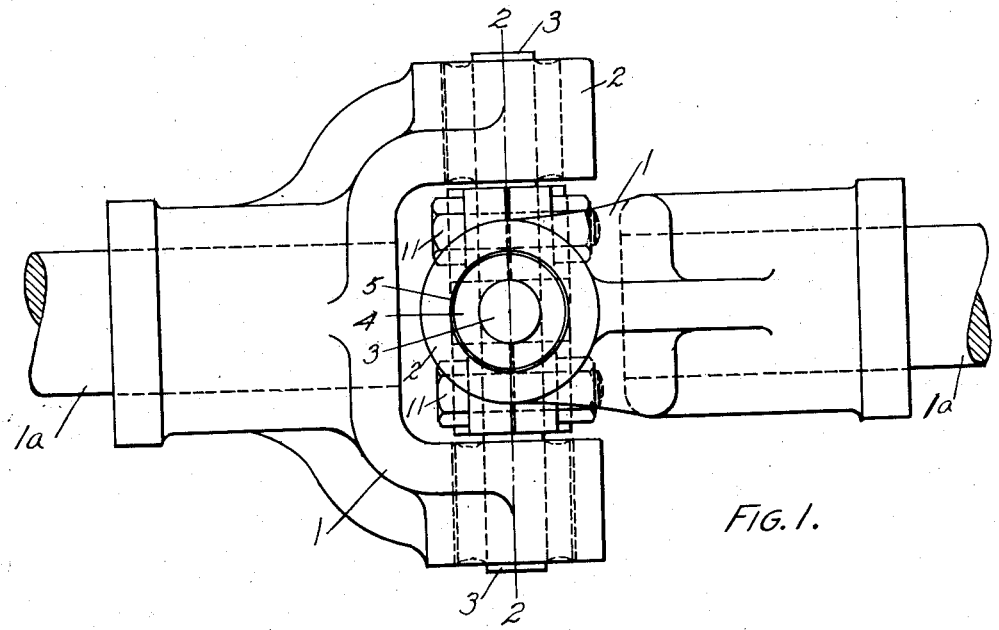
Figure 2:
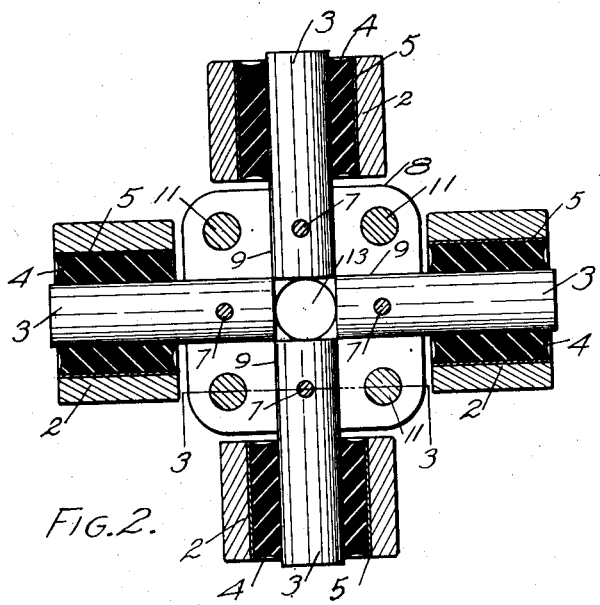
Figure 3:
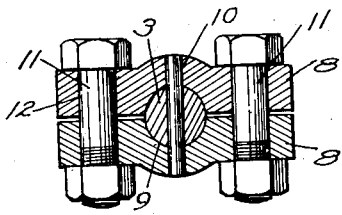

Fig. 1 shows a plan view of the universal.
Fig. 2 a section on the line 2—2 in Fig. 1.
Fig. 3 a section on the line 3—3 in Fig. 2.

1 marks the forks of the universal which extend from shafts 1ª. The forks have the sleeves 2 at their ends. Rubber joint elements each comprise an inner pin 3, and interposed wall of rubber 4, and an outer steel shell 5, and are arranged within the sleeves 2. The rubber of these elements is preferably bonded to the inner surface of the shell and the outer surface of the pin—at any rate locked with these surfaces.

The pins extend inwardly from the rubber element and have cross pins 7. The block is made up of halves 8 and these blocks are provided with cross grooves 9 which are milled into the face of the block and the pins 7 extend into perforations 10.

The halves of the blocks are drawn together by bolts 11 extending through perforations 12 in the blocks. While I have shown four of these bolts arranged at the corners of the block a single bolt through the opening 13 may suffice.

With this construction the joint elements are simply forced into the forks 2 with the pressed fit with the cross pins 7 arranged parallel to the axis of the shafts 1ª and the joint may be then readily assembled in place and at a slight angle as is common in automobile construction. The pins 10 not only assure the turning of the pins to the intermediate, or neutral position as to the twisting or distortion of the rubber but also locate the pins accurately radially so that the sleeves, which are normally out of contact with the block, are equally spaced from the axis of the joint and in the ordinary operation all that the operator needs to do is to see that the sleeves 5 of the joint element comes flush with the sleeve 2.

While I have shown the pins extending toward the center of the fork as disconnected, or non-integral at the center it will be understood that the invention and structure are not limited to such a separation of opposing pins at the center.

What I claim as new is:—

1. In a universal joint, the combination of a fork having bearing sleeves at its ends; pins extending through the sleeves toward the center of the fork; rubber inserts between the sleeves and pins, said inserts being locked with the sleeves and pins; a block having grooves engaging the pins; and means clamping the pins in the grooves.

2. In a universal joint, the combination of a fork having bearing sleeves at its ends; pins extending through the sleeves toward the center of the fork; rubber inserts between the sleeves and pins, said inserts being locked with the sleeves and pins; a central block; and means securing the pins to the block, said pins having projections engaging the block and positioning the pins in neutral relation relatively to the rubber inserts.

3. In a universal joint, the combination of a fork having bearing sleeves at its ends; pins extending through the sleeves toward the center of the fork; rubber inserts between the sleeves and pins, said inserts being locked with the sleeves and pins; a central block; and means securing the pins to the block, said pins having projections, the projections on the pins positioning the pins radially to the block.

4. In a universal joint, the combination of a fork having bearing sleeves at its ends; pins extending through the sleeves toward the center of the fork; rubber inserts between the sleeves and pins, said inserts being locked with the sleeves and pins; a central block; and means securing the pins to the block, said pins having projections positioning the pins radially and with the rubber of each insert in neutral condition with the joint swung to a point intermediate the ends of the throw of such joint.

5. In a universal joint, the combination of a pair of forks having bearing sleeves at their ends; joint elements arranged in the sleeves comprising joint pins extending through the sleeves and inwardly from the sleeves, said elements also comprising rubber inserts locked with the pins and the sleeves; cross pins extending through the joint pins; a central block formed of two halves having cross grooves receiving the joint pins and cross pins; and means clamping the halves together.

6. In a universal joint, the combination of a pair of forks, each having sleeves at their ends; joint elements comprising an outer steel shell and a central joint pin with a rubber insert between the shell and pin locked with the shell and pin, said shell being secured in the sleeves by a pressed fit; a central block formed in halves having cross grooves receiving the joint pins; and means on the joint pins engaging the block locating the pins radially and rotatively.

7. In a universal joint, the combination of a fork having bearing sleeves at its ends; pins extending through the sleeves toward the center of the fork; rubber inserts between the sleeves and pins, said inserts being locked with the sleeves and pins; a central block; and means securing the pins to the block, said pins being positioned to bring the rubber in each insert to neutral condition with the joint swung to a point intermediate the ends of the throw of such joint.

8. In a universal joint, the combination of a fork having bearing sleeves at its ends; pins extending through the sleeves toward the center of the fork; rubber inserts between the sleeves and pins, said inserts being locked with the sleeves and pins; a central block; and means securing the pins to the block and positioning the pins radially in the block.

In testimony whereof I have hereunto set my hand.

HUGH C. LORD.